US012513258B2

(12) United States Patent
Shirai (10) Patent No.: US 12,513,258 B2
(45) Date of Patent: Dec. 30, 2025

(54) INFORMATION PROCESSING APPARATUS

(71) Applicant: CANON KABUSHIKI KAISHA, Tokyo (JP)

(72) Inventor: Kunihiro Shirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 18/503,235

(22) Filed: Nov. 7, 2023

(65) Prior Publication Data
US 2024/0163391 A1    May 16, 2024

(30) Foreign Application Priority Data

Nov. 11, 2022  (JP) ................................. 2022-180945

(51) Int. Cl.
| H04N 5/262 | (2006.01) |
| G06F 1/16 | (2006.01) |
| G06F 3/01 | (2006.01) |
| G06F 3/14 | (2006.01) |
| H04N 5/265 | (2006.01) |

(52) U.S. Cl.
CPC ........... *H04N 5/2628* (2013.01); *G06F 1/163* (2013.01); *G06F 3/011* (2013.01); *G06F 3/1407* (2013.01); *H04N 5/265* (2013.01)

(58) Field of Classification Search
None
See application file for complete search history.

(56) References Cited

U.S. PATENT DOCUMENTS

| 10,887,653 | B2 * | 1/2021 | Hsieh | ................. | H04N 21/6587 |
| 2008/0174659 | A1 * | 7/2008 | McDowall | ............. | H04N 5/265 |
| | | | | | 348/E15.001 |
| 2021/0096726 | A1 * | 4/2021 | Faulkner | ................. | G06F 3/017 |
| 2021/0097776 | A1 * | 4/2021 | Faulkner | .............. | G06V 40/113 |
| 2021/0271081 | A1 * | 9/2021 | Yun | ...................... | H04N 13/344 |
| 2021/0286502 | A1 * | 9/2021 | Lemay | .................. | G06T 19/006 |
| 2022/0206572 | A1 * | 6/2022 | Goodrich | ............... | G06V 20/20 |
| 2023/0342487 | A1 * | 10/2023 | Joseph | ................. | G06V 40/166 |

FOREIGN PATENT DOCUMENTS

WO         2019097639 A1    5/2019

* cited by examiner

*Primary Examiner* — Talha M Nawaz
(74) *Attorney, Agent, or Firm* — Venable LLP (57) ABSTRACT

An information processing apparatus including a processor and a memory storing a program that, when executed by the processor, causes the information processing apparatus to execute acquisition processing of acquiring a remote location person image that is an image acquired by capturing an image of a person at the remote location, to execute acquisition processing of acquiring a field-of-view image that represents a range in a real space where a user is present, the range corresponding to a field of view of the user, to execute composition processing of obtaining a composite image by combining the remote location person image with the field-of-view image, the remote location person image being combined at a position of an imaging device capturing an image of the user in a size based on a positional relationship between the user and the imaging device, and to execute control processing to display the composite image.

20 Claims, 6 Drawing Sheets

INFORMATION PROCESSING APPARATUS

CROSS-REFERENCE TO PRIORITY APPLICATION

This application claims the benefit of Japanese Patent Application No. 2022-180945, filed on Nov. 11, 2022, which is hereby incorporated by reference herein in its entirety.

BACKGROUND OF THE INVENTION

Field of the Invention

The present invention relates to an information processing apparatus. In particular, the present invention relates to a mixed reality image display.

Description of the Related Art

Mixed reality (MR) technology is known as a technology for seamlessly merging a real world with a virtual world in real time. The MR technology may be used in video see-through head-mounted displays (HMDs). When a video see-through HMD is used, for example, an image of a range corresponding to the field of view of a user wearing the HMD in a real space is captured by a video camera. Computer graphics (CG) is then combined with the image (video) of the real space acquired by the video camera, and the composite image (the image obtained by combining the CG with the real space image) is displayed on a display panel provided on the inside of the HMD. When viewing the composite image displayed on the display panel, the user can feel as if virtual objects created by CG actually exist in the real space.

In addition, by combining an image of a person captured at a remote location with an image of a real space, the video see-through HMD can provide the user wearing the HMD with an experience (feeling) as if the user is in the same space where the person at the remote location is.

WO 2019/097639 discloses a technique for changing the orientation of a virtual screen on which an image of a person at a remote location is projected in accordance with the position of the person in chroma-key compositing. According to the technique disclosed in WO 2019/097639, a composite image that does not give a user wearing an HMD a sense of incongruity.

A case in which a user wearing an HMD and a person at a remote location communicate with each other by using their respective images (videos) will be considered. In this case, the technique disclosed in WO 2019/097639 may result in communication that causes a sense of incongruity (unnatural communication). For example, the user wearing the HMD can communicate with the person at the remote location without feeling a sense of incongruity, feeling as if the user is facing the person. However, the person at the remote location cannot obtain a feeling as if the person is facing the user wearing the HMD and may have a sense of incongruity in communicating with the user.

SUMMARY OF THE INVENTION

The present invention provides a technique for enabling, when two persons located away from each other communicate with each other by using their respective images (videos), each person to communicate without feeling a sense of incongruity.

The present invention in its first aspect provides an information processing apparatus including at least one memory and at least one processor that function as an acquisition unit configured to acquire a person image that is an image acquired by capturing a person at a remote location and a control unit configured to control a display to display the person image at a position of an imaging device in a real space where a user is present, the imaging device transmitting an image acquired by capturing the user to the remote location.

The present invention in its second aspect provides a control method of an information processing apparatus, including acquiring a person image that is an image acquired by capturing a person at a remote location and controlling a display to display the person image at a position of an imaging device in a real space where a user is present, the imaging device transmitting an image acquired by capturing the user to the remote location.

The present invention in its third aspect provides a non-transitory computer readable medium that stores a program, wherein the program causes a computer to execute a control method of an information processing apparatus, the control method including acquiring a person image that is an image acquired by capturing a person at a remote location and controlling a display to display the person image at a position of an imaging device in a real space where a user is present, the imaging device transmitting an image acquired by capturing the user to the remote location.

Further features of the present invention will become apparent from the following description of exemplary embodiments with reference to the attached drawings.

DESCRIPTION OF THE EMBODIMENTS

Embodiment 1

Figure 1A:
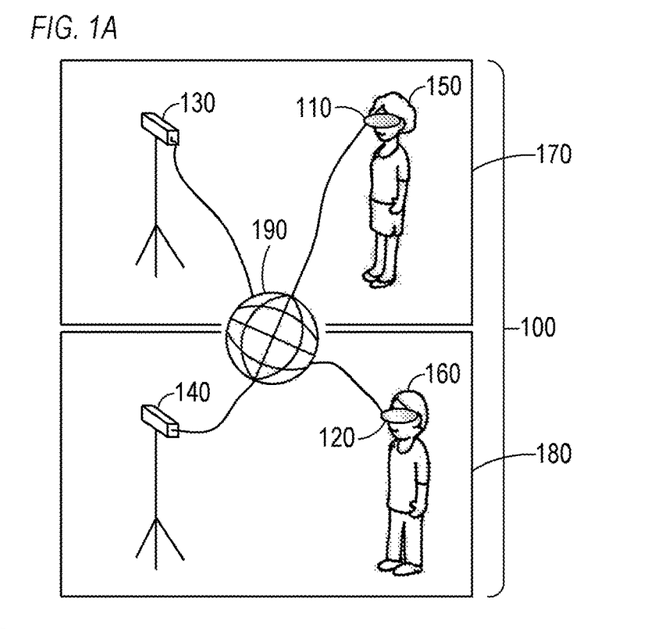
FIGS. 1A and 1B illustrate a configuration of an information processing system according to Embodiment 1.
Figure 1B:
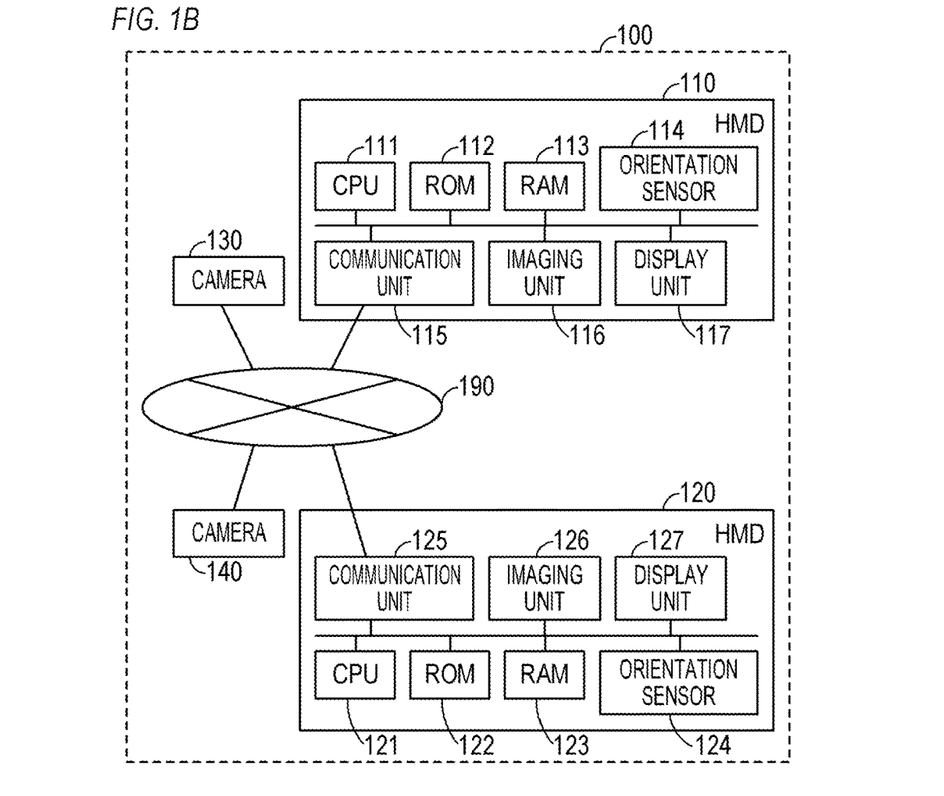

Hereafter, Embodiment 1 of the present invention will be described. FIG. 1A is a schematic diagram illustrating a configuration of an information processing system 100 according to Embodiment 1, and FIG. 1B is a block diagram illustrating the configuration of the information processing system 100. The information processing system 100 includes head-mounted displays (HMDs) 110 and 120, and cameras 130 and 140. The HMD 110, the HMD 120, the camera 130, and the camera 140 are connected to a network 190 and can communication with each other via the network 190. A space 170 (for example, a room of a person 150) in which the person 150, who is a user of the HMD 110, is present, is different from a space 180 (for example, a room of a person 160) in which the person 160, who is a user of the HMD 120, is present. The person 150 wears the HMD 110 on the head, and the person 160 wears the HMD 120 on the head. The camera 130 is placed in the space 170 where the person 150 is present, and the camera 140 is placed in the space 180 where the person 160 is present.

The HMD 110 includes a CPU 111, a ROM 112, a RAM 113, an orientation sensor 114, a communication unit 115, an imaging unit 116, and a display unit 117. The CPU 111 is an arithmetic device that controls the entire HMD 110 and performs various kinds of processing by executing various programs stored in the ROM 112, for example. The ROM 112 is read-only non-volatile memory that stores various kinds of information (for example, various programs and various parameters). The RAM 113 is a memory that temporarily stores various pieces of information and is also used as a work memory of the CPU 111. The orientation sensor 114 is a sensor that detects the orientation of the HMD 110 and includes, for example, at least one of an acceleration sensor and a geomagnetic sensor. A gyro sensor is a type of acceleration sensor. The communication unit 115 performs wire or wireless communication with an external device. The imaging unit 116 acquires a field-of-view image representing a range (in front of the HMD 110) corresponding to the field of view of the person 150 wearing the HMD 110 in a real space by capturing an image of the range. The imaging unit 116 includes, for example, an imaging sensor such as a CCD sensor or a CMOS sensor. The display unit 117 can display various images and various kinds of information. The display unit 117 includes, for example, a display panel such as a liquid crystal panel or an organic EL panel. The person 150 can view an image (video) displayed on the display unit 117 by wearing the HMD 110. The HMD 110 is a video see-through HMD and the CPU 111 can display the field-of-view image acquired by the imaging unit 116 on the display unit 117.

The HMD 120 includes a CPU 121, a ROM 122, a RAM 123, an orientation sensor 124, a communication unit 125, an imaging unit 126, and a display unit 127. The HMD 120 has a configuration similar to that of the HMD 110.

The camera 130 is an imaging device that acquires a space image representing at least a part of the space 170 by capturing an image of the person 150 (the space 170 in which the person 150 is present). The camera 130 transmits the space image of the space 170 to the HMD 120 via the network 190. In the HMD 120, at least a part of the space image of the space 170 is displayed on the display unit 127 by the control of the CPU 121. The portion (display range) of the space image of the space 170 to be displayed on the display unit 127 can be changed in accordance with the orientation of the HMD 120 (the detection result of the orientation sensor 124). By viewing the image displayed on the display unit 127, the person 160 can feel as if the person 160 is in the same space 170 as the person 150.

The camera 140 is an imaging device that acquires a space image representing at least a part of the space 180 by capturing an image of the person 160 (the space 180 in which the person 160 is present). The camera 140 transmits the space image of the space 180 to the HMD 110 via the network 190. In the HMD 110, the region of the person 160 is extracted from the space image of the space 180 by the control of the CPU 111. As a result, a person image, which is an image (an image representing only the person 160) acquired by capturing the person 160, is obtained. Next, the person image is combined with the field-of-view image (the image of the field of view of the person 150) acquired by the imaging unit 116, and the composite image (the image obtained by combining the person image with the field-of-view image) is displayed on the display unit 117. By viewing the image displayed on the display unit 117, the person 150 can feel as if the person 160 is in the same space 170 as the person 150.

As described above, the information processing system 100 can provide a feeling as if the person 150 in the space 170 and the person 160 in the space 180 are in the same space 170.

According to the operation described above, the person 160 is invited to the space 170 where the person 150 is present. Thus, the space 170 in which the person 150 is present can be regarded as a host side, and the space 180 where the person 160 is present can be regarded as a guest side.

While the cameras 130 and 140 may be a monocular camera, it is preferable that the cameras 130 and 140 be a stereo camera. When the camera 130 is a stereo camera, the person 150 wearing the HMD 110 can stereoscopically view two images having a parallax so that the person 150 can obtain a higher sense of immersion. Similarly, when the camera 140 is a stereo camera, the person 160 wearing the HMD 120 can stereoscopically view two images having a parallax so that the person 160 can obtain a higher sense of immersion.

In addition, it is preferable that the host-side camera 130 have a wide imaging range. For example, the viewing angle (angle of view) may be a range of one hundred eighty degrees or a range of three hundred sixty degrees. The image acquired by the host-side camera 130 may be a hemispherical image (a VR180 image), a spherical omnidirectional image (an omnidirectional image), or a panoramic image. Since the host-side camera 130 has a wide imaging range, the guest-side person 160 can view the image of the host-side space 170 even when significantly changing the orientation of the face. Therefore, the guest-side person 160 can feel as if the guest-side person 160 is in the host-side space 170.

In Embodiment 1, it is assumed that the guest-side person 160 faces the guest-side camera 140. Thus, the host-side person 150 can communicate with the guest-side person 160 without feeling a sense of incongruity, feeling as if the host-side person 150 is facing the guest-side person 160 (the person at the remote location).

However, in the conventional art, the guest-side person 160 cannot obtain a feeling as if the guest-side person 160 is facing the host-side person 150 (the person at a remote location), and this may cause the guest-side person 160 to feel a sense of incongruity in communicating with the host-side person 150. In the information processing system 100, the eyepoint of the guest-side person 160 is set at the position of the host-side camera 130. Here, suppose the person image representing the guest-side person 160 is displayed at a position different from the position of the host-side camera 130. In this case, the guest-side person 160 cannot obtain a feeling of facing the host-side person 150 when the host-side person 150 faces in the direction of the person image.

Therefore, in Embodiment 1, the person image is displayed at the position of the host-side camera 130. In this way, the guest-side person 160 can also feel as if the guest-side person 160 is facing the host-side person 150.

Figure 2:
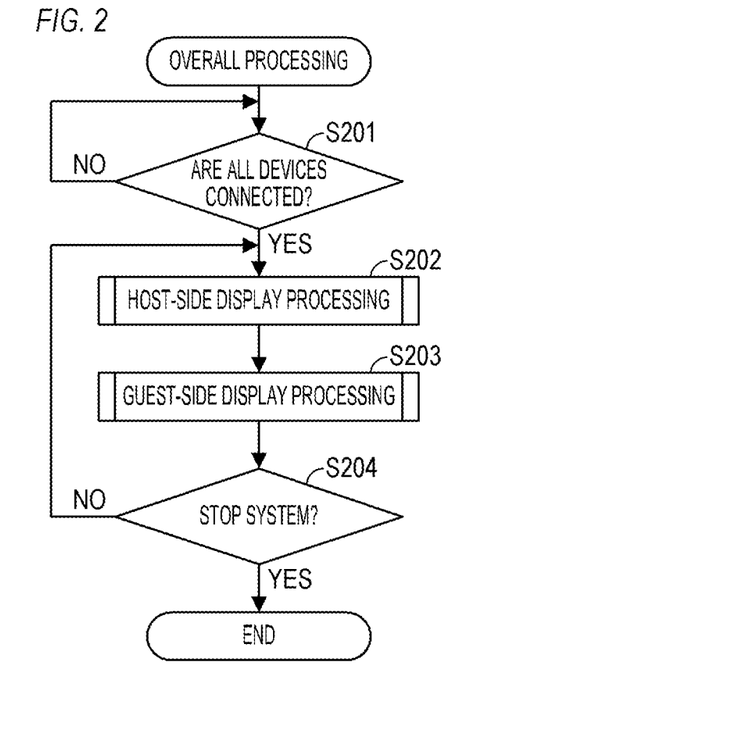
FIG. 2 is a flowchart illustrating overall processing according to Embodiment 1.

FIG. 2 is a flowchart illustrating overall processing performed by the information processing system 100. For example, when the information processing system 100 (the host-side HMD 110, the guest-side HMD 120, the host-side camera 130, and the guest-side camera 140) is activated, the overall processing in FIG. 2 is started.

In step S201, the CPU 111 of the host-side HMD 110 determines whether the host-side HMD 110, the guest-side HMD 120, the host-side camera 130, and the guest-side camera 140 are connected to each other (via the network 190). The CPU 111 stands by until it is determined that these four devices are connected to each other, and when it is determined that the four devices are connected to each other, the CPU 111 performs the processing in step S202.

In step S201, the CPU 121 of the guest-side HMD 120 also determines whether the above four devices are connected to each other. The CPU 121 stands by until it is determined that the four devices are connected to each other, and when it is determined that the four devices are connected to each other, the CPU 121 performs the processing in step S203. Although step S203 is illustrated as a step subsequent to step S202 in FIG. 2, the processing in step S203 may be performed before the processing in step S202, or the processing in step S202 and the processing in step S203 may be performed in parallel.

In step S202, the CPU 111 of the host-side HMD 110 performs host-side display processing. Details of the host-side display processing will be described below with reference to FIG. 3.

In step S203, the CPU 121 of the host-side HMD 120 performs guest-side display processing. Details of the guest-side display processing will be described below with reference to FIG. 5.

In step S204, the CPU 111 of the host-side HMD 110 determines whether to stop the information processing system 100. The CPU 111 repeatedly performs the host-side display processing (step S202) per frame until it is determined to stop the information processing system 100, and, when it is determined to stop the information processing system 100, the overall processing in FIG. 2 ends.

In step S204, the CPU 121 of the guest-side HMD 120 also determines whether to stop the information processing system 100. The CPU 121 repeatedly performs the guest-side display processing (step S203) per frame until it is determined to stop the information processing system 100, and, when it is determined to stop the information processing system 100, the overall processing in FIG. 2 ends.

Figure 3:
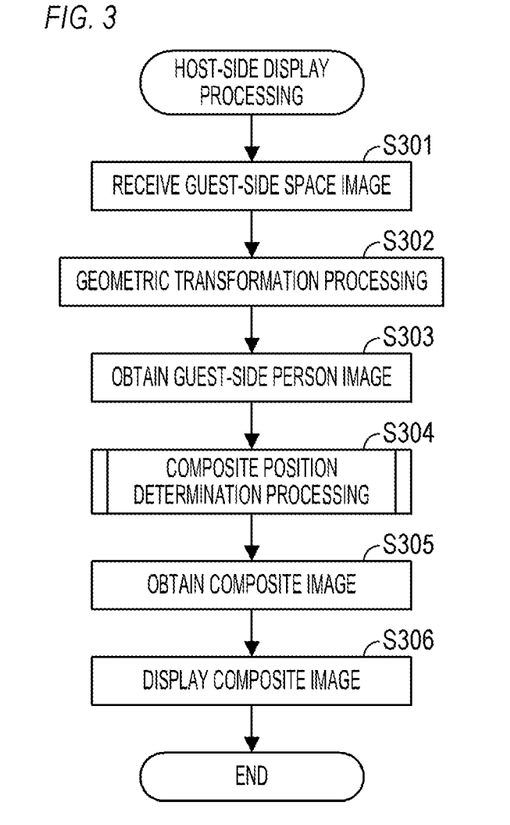
FIG. 3 is a flowchart illustrating host-side display processing according to Embodiment 1.

FIG. 3 is a flowchart illustrating the host-side display processing (step S202 in FIG. 2). The host-side display processing is performed by the CPU 111 of the host-side HMD 110.

In step S301, the CPU 111 receives (obtains) a space image of the guest-side space 180 from the guest-side camera 140 by using the communication unit 115. If a part of the guest-side person 160 is not captured in the space image of the guest-side space 180, a composite image that causes a sense of incongruity (an unnatural composite image in which a part of the guest-side person 160 is not rendered) may be obtained. Therefore, it is preferable that the whole body of the guest-side person 160 be captured in the space image of the guest-side space 180.

In step S302, the CPU 111 performs geometric transformation processing on the space image obtained in step S301 as needed. For example, when the guest-side camera 140 performs image capturing using a super wide-angle lens such as a fisheye lens, the CPU 111 needs to perform geometric transformation processing such as equirectangular projection transformation to acquire a space image suitable for composition.

In step S303, the CPU 111 extracts the region of the guest-side person 160, which is a main object, from the space image obtained in step S301 (the space image on which the geometric transformation processing in step S302 has been performed). As a result, a person image that is an image acquired by capturing the guest-side person 160 (the image representing only the guest-side person 160) is obtained. The method for extracting the region of the guest-side person 160 is not particularly limited. For example, the image of the guest-side person 160 may be captured in green back, and the region of the guest-side person 160 may be extracted by chroma key processing. The region of the guest-side person 160 may be extracted by using an operator (trained models) trained by machine learning such as deep learning. The extraction method is selected in view of system resources and extraction accuracy.

In step S304, the CPU 111 determines the composite position (display position) of the person image obtained in step S303 (composite position determination processing). Details of the composite position determination processing will be described with reference to FIG. 4.

In step S305, the CPU 111 combines the person image obtained in step S303 with the field-of-view image (the field-of-view image of the host-side person 150) acquired by the imaging unit 116 of the host-side HMD 110. The person image is combined at the composite position determined in step S304. As a result, a composite image in which the guest-side person 160 appears to be in the host-side space 170 is obtained. While details will be described below, a composite size (display size) of the person image is also determined in step S304. In step S305, the person image is combined in the composite size determined in step S304.

In step S306, the CPU 111 displays the composite image obtained in step S305 on the display unit 117.

Figure 4:
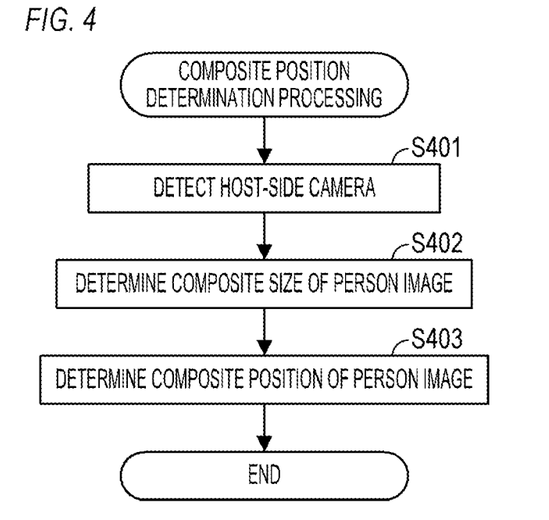
FIG. 4 is a flowchart illustrating composite position determination processing according to Embodiment 1.

FIG. 4 is a flowchart illustrating the composite position determination processing (step S304 in FIG. 3). As described above, in the information processing system 100, the eyepoint of the guest-side person 160 is set at the position of the host-side camera 130. Therefore, it is preferable to display the person image at the position of the host-side camera 130, and it is more preferable to display the region of the face of the guest-side person 160 in the person image at the position of the host-side camera 130. Further, it is particularly preferable to display the region of the eyes of the guest-side person 160 (the region of the guest-side HMD 120) in the person image at the position of the lens of the host-side camera 130. In the composite position determination processing in FIG. 4, the CPU 111 determines the position of the host-side camera 130 as the composite position (display position) of the person image.

In step S401, the CPU 111 detects the host-side camera 130 from the field-of-view image (the image of the field-of-view of the host-side person 150) acquired by the imaging unit 116 of the host-side HMD 110. For example, the host-side camera 130 is detected by pattern matching.

The detection method is not particularly limited as long as the host-side camera 130 can be detected from the host-side space 170. For example, a marker (known marker) placed in advance in the host-side space 170 may be detected, and the host-side camera 130 may be detected based on the detection result of the marker. The marker may be placed on the host-side camera 130 or may be placed at a position away from the host-side camera 130. When the marker is placed on the host-side camera 130, even if the position of the host-side camera 130 is changed, the host-side camera 130 can be detected based on the detection result of the marker. For example, the position of the marker can be detected as the position of the host-side camera 130. The host-side camera 130 may be detected in accordance with an instruction from the host-side person 150 (the user of the host-side HMD 110). For example, a position designated by the host-side person 150 may be detected as the position of the host-side camera 130. The host-side camera may be detected without using the field-of-view image.

The host-side person 150 can issue various instructions by using, for example, a controller (not illustrate) of the host-side HMD 110. The field-of-view image may be transmitted to an information processing apparatus such as a personal computer or a smartphone via the network 190 and may be displayed on the information processing apparatus side. Further, the host-side person 150 may designate the position of the host-side camera 130 by using an operation member provided in the information processing apparatus or an operation device (for example, a keyboard and a mouse) connected to the information processing apparatus.

In step S402, the CPU 111 determines the composite size (display size) of the person image based on the positional relationship between the host-side person 150 (the host-side HMD 110) and the host-side camera 130. For example, the CPU 111 determines the resizing ratio of the person image as a value corresponding to the composite size (display size) of the person image.

For example, when the actual size of the host-side camera 130 in a predetermined direction such as the vertical direction is 15 cm, the size of the host-side camera 130 in the field-of-view image is 150 pix, the actual size of the face of the guest-side person 160 is 30 cm, and the size of the face of the guest-side person 160 in the person image is 500 pix, if the person image is combined with the field-of-view image at a rate of 10 pix per 1 cm (=150 pix/15 cm), the size of the guest-side person 160 matches the size of the other objects in the composite image. Thus, the CPU 111 determines a reduction ratio of 300 pix/500 pix as the reduction ratio of the person image so that the face of 30 cm is combined to be a face of 300 pix.

A resizing ratio α of the person image can be calculated by using the following Equation 1, where the actual size of the host-side camera 130 is represented by A cm, the size of the host-side camera 130 in the field-of-view image is represented by X pix, the actual size of the face of the guest-side person 160 is represented by B cm, and the size of the face of the guest-side person 160 in the person image is represented by Y pix.

$$\alpha = (B \times X)/(A \times Y)$$ (Equation 1)

The actual size of the host-side camera 130 may be registered in advance in the host-side HMD 110. The actual size of the host-side camera 130 may be calculated based on the focal length of the host-side camera 130, the shooting distance of the host-side camera 130, and the size of the host-side camera 130 in the field-of-view image. The size of the host-side camera 130 in the field-of-view image may be the size (the number of pixels) of the region of the host-side camera 130 detected by pattern matching or may be the size corresponding to the size of the marker in the field-of-view image. The size of the host-side camera 130 in the field-of-view image may be designated by host-side person 150. The actual size of the host-side camera 130 may be calculated based on the size of the marker in the field-of-view image. Similarly, the actual size of the face of the guest-side person 160 may be registered in advance in the host-side HMD 110. The actual size of the face of the guest-side person 160 may be calculated based on the focal length of the guest-side camera 140, the shooting distance of the guest-side camera 140, and the size of the face of the guest-side person 160 in the person image.

In step S403, the CPU 111 determines the position of the host-side camera 130 detected in step S401 as the composite position (display position) of the person image. For example, the composite position of the person image is determined such that the region of the face of the guest-side person 160 in the person image is placed at the position of the host-side camera 130. The composite position of the person image may be determined such that the region of the eyes of the guest-side person 160 (the region of the guest-side HMD 120) in the person image is placed at the position of the lens of the host-side camera 130.

Figure 5:
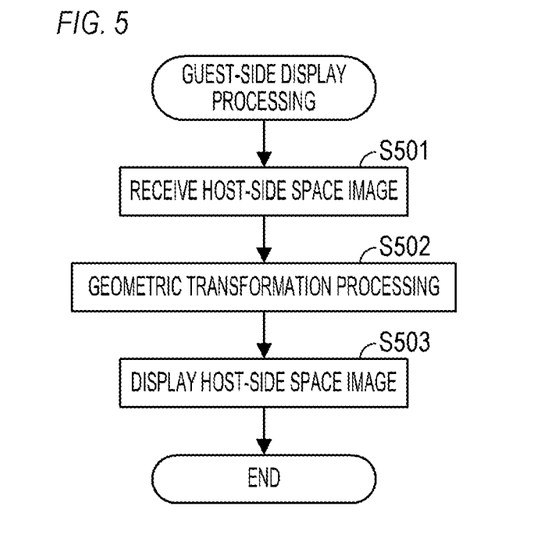
FIG. 5 is a flowchart illustrating guest-side display processing according to Embodiment 1.

FIG. 5 is a flowchart illustrating the guest-side display processing (step S203 in FIG. 2). The guest-side display processing is performed by the CPU 121 of the guest-side HMD 120.

In step S501, the CPU 121 receives (obtains) the space image of the host-side space 170 from the host-side camera 130 by using the communication unit 125.

In step S502, the CPU 121 performs geometric transformation processing on the space image obtained in step S501 as needed. For example, when the host-side camera 130 is a wide-angle stereo camera, the CPU 121 needs to perform geometric transformation processing such as equirectangular projection transformation and perspective projection transformation so as to obtain a space image suitable for stereoscopic viewing.

In step S503, the CPU 121 displays the space image obtained in step S501 (the space image on which the geometric transformation processing in step S502 has been performed) on the display unit 127.

As described above, according to Embodiment 1, a person image that is an image acquired by capturing a person at a remote location is obtained on the host side. Next, the obtained person image is displayed at a position of an imaging device in a real space where a user is present, the imaging device transmitting an image acquired by capturing the user to the remote location. As a result, when two persons located away from each other communicate with each other by using their respective images (videos), each person can communicate without feeling a sense of incongruity.

Embodiment 2

Hereafter, Embodiment 2 of the present invention will be described. In the following description, the same description as in Embodiment 1 (for example, the description about the same configuration and processing as in Embodiment 1) will be omitted, and the difference between Embodiment 1 and Embodiment 2 will be described.

In Embodiment 1, the face of the guest-side person 160 is placed at the position of the host-side camera 130, and the eyes of the guest-side person 160 (the guest-side HMD 120) are placed at the position of the lens of the host-side camera 130. However, an unnatural composite image may be obtained depending on the height of the guest-side person 160 and the installation location of the host-side camera 130 (for example, the height of a tripod supporting the host-side camera 130). Thus, in Embodiment 2, a method of adjusting the composite position (display position) of the person image will be described.

Figure 6A:
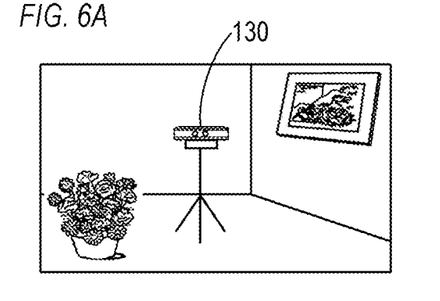
FIGS. 6A to 6E illustrate various images according to Embodiment 2.
Figure 6B:
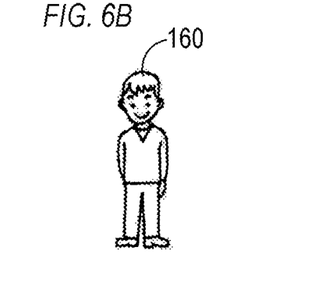

FIGS. 6A to 6E illustrate various images according to Embodiment 2. FIG. 6A illustrates a field-of-view image (a field-of-view image of a host-side person 150) acquired by an imaging unit 116 of a host-side HMD 110. A host-side camera 130 appears in the center of the field-of-view image. The host-side camera 130 is supported by a tripod. FIG. 6B illustrates a person image representing a guest-side person 160. A guest-side HMD 120 is omitted in the person image in FIG. 6B.

Figure 6C:
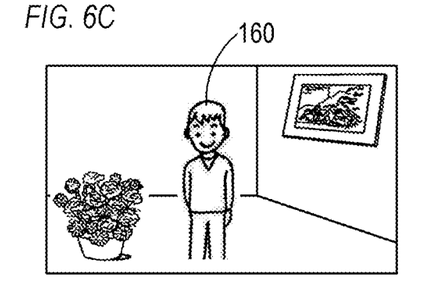

FIG. 6C illustrates a composite image obtained by combining the person image in FIG. 6B with the field-of-view image in FIG. 6A. The eyes of the guest-side person 160 (the guest-side HMD 120) are placed at the position of the lens of the host-side camera 130 so that the guest-side person 160 can feel as if the guest-side person 160 is facing the host-side person 150. However, the height of the tripod is so low that an unnatural composite image, in which the feet of the guest-side person 160 appear to be buried under the floor, is obtained. If the height of the tripod is too high, an unnatural composite image, in which the guest-side person 160 appears to be floating in the air, will be obtained. In addition, if such an unnatural composite image is obtained, since the eyepoint of the guest-side person 160 is set at the unnatural position (too high or too low), the guest-side person 160 will feel a sense of incongruity.

Therefore, when the composite image illustrated in FIG. 6C is obtained, the composite position (display position) of the person image is adjusted on the host side.

Figure 7:
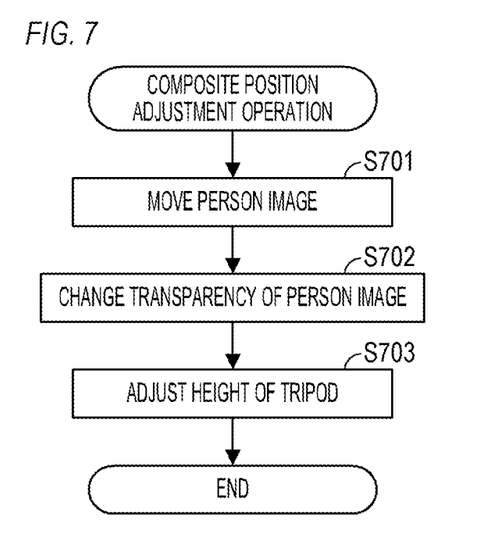
FIG. 7 is a flowchart illustrating an adjustment operation according to Embodiment 2.

FIG. 7 is a flowchart illustrating a composite position adjustment operation.

In step S701, the CPU 111 in the host-side HMD 110 moves the person image in accordance with an instruction from the host-side person 150 (the user of the host-side HMD 110).

Figure 6D:
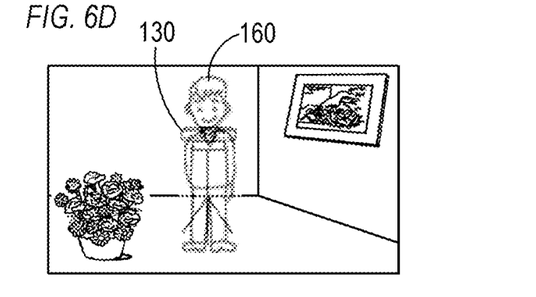

In step S702, the CPU 111 increases transparency of the person image. The instruction to change the transparency of the person image may be issued by the host-side person 150, or the transparency of the person image may be automatically changed when an instruction to move the person image is issued. By increasing the transparency of the person image, the positional relationship between the person image and the host-side camera 130 can be easily grasped. FIG. 6D illustrates the composite image on which the processing in step S702 has been performed.

The host-side person 150 can issue various instructions by using, for example, a controller (not illustrated) of the host-side HMD 110. The composite image is transmitted to an information processing apparatus such as a personal computer or a smartphone via a network 190, and the field-of-view image may be displayed on the information processing apparatus side. The host-side person 150 may issue an instruction to move the person image by using an operation member provided in the information processing apparatus or an operation device (for example, a keyboard or a mouse) connected to the information processing apparatus.

Figure 6E:
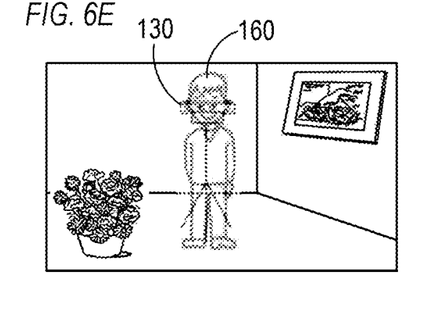

In step S703, the host-side person 150 adjusts the height of the tripod. For example, the height of the tripod is adjusted such that the region of the face of the guest-side person 160 in the person image is placed at the position of the host-side camera 130. The height of the tripod may be adjusted such that the region of the eyes of the guest-side person 160 (the region of the guest-side HMD 120) in the person image is placed at the position of the lens of the host-side camera 130. FIG. 6E illustrates the composite image on which the processing in step S703 has been performed. Thereafter, the transparency of the person image is restored to its original state in accordance with, for example, an instruction from the user.

When the position of the host-side camera 130 is changed, the CPU 111 may update the composite position (display position) of the person image so that the person image continues to be displayed at the position of the host-side camera 130 (the person image follows the host-side camera 130). This eliminates the need for issuing the instruction to move the person image. In this case, too, when the host-side person 150 adjusts the height of the tripod, the transparency of the person image may be changed (increased).

As described above, according to Embodiment 2, the composite position (display position) of the person image is adjusted to a suitable position. When the adjustment operation is performed, the transparency of the person image is changed (increased) so as to assist the adjustment of the composite position. As a result, when two persons located away from each other communicate with each other by using their respective images (videos), each person can communicate with even less sense of incongruity.

The above-described embodiments (including the modifications) are merely examples, and a configuration obtained by appropriately modifying or changing any of the configurations of the above-described embodiments within the scope of the gist of the present invention is also included in the present invention. A configuration obtained by appropriately combining the configurations of the above-described embodiments is also included in the present invention.

For example, while the example using a video see-through HMD has been described, an optical see-through HMD may be used. The optical see-through HMD may or may not include an imaging unit for acquiring a field-of-view image. In addition, the guest-side HMD 120 may perform processing similar to the host-side display processing (FIG. 3). As a result, the guest-side person 160 can feel as if the host-side person 150 is in the same guest-side space 180 where the guest-side person 160 is. In addition, at least a part of the above-described processing performed by the HMD may be performed by an information processing apparatus other than the HMD, and the apparatus to which the present invention is applied does not need to be an HMD. For example, the present invention may be applied to an information processing apparatus that includes no display unit, such as a personal computer connected to an HMD. The present invention may be applied to a cloud server provided on the network 190.

According to the present invention, when two persons located away from each other communicate with each other by using their respective images (videos), each person can communicate without feeling a sense of incongruity.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   a processor; and
   a memory storing a program that, when executed by the processor, causes the information processing apparatus:
   to execute acquisition processing of acquiring a remote location person image that is an image acquired by capturing an image of a person at the remote location;
   to execute acquisition processing of acquiring a field-of-view image that represents a range in a real space where a user is present, the range corresponding to a field of view of the user;
   to execute composition processing of obtaining a composite image by combining the remote location person image with the field-of-view image, the remote location person image being combined at a position of an imaging device capturing an image of the user and in a size based on a positional relationship between the user and the imaging device; and
   to execute control processing of controlling a display to display the composite image.

2. The information processing apparatus according to claim 1, wherein the program, when executed by the processor, further causes the information processing apparatus to execute detection processing of detecting the imaging device from the real space.

3. The information processing apparatus according to claim 2, wherein, in the detection processing the imaging device is detected by detecting a marker placed in advance in the real space.

4. The information processing apparatus according to claim 2, wherein, in the detection processing the imaging device is detected in accordance with an instruction from the user.

5. The information processing apparatus according to claim 1, further comprising an image sensor configured to acquire the field-of-view image by capturing the range in the real space.

6. The information processing apparatus according to claim 1, further comprising the display.

7. The information processing apparatus according to claim 1, wherein the information processing apparatus is a head-mounted display (HMD).

8. The information processing apparatus according to claim 1, wherein the program, when executed by the processor, further causes the information processing apparatus to execute change processing of changing transparency of the remote location person image.

9. The information processing apparatus according to claim 1, wherein the program, when executed by the processor, further causes the information processing apparatus to place a region of a face of the person in the remote location person image at a position of the imaging device.

10. The information processing apparatus according to claim 1, wherein the program, when executed by the processor, further causes the information processing apparatus to place a region of eyes of the person in the remote location person image at a position of a lens of the imaging device.

11. A control method of controlling an information processing apparatus, the control method comprising:
    acquiring a remote location person image that is an image acquired by capturing an image of a person at the remote location;
    acquiring a field-of-view image that represents a range in a real space where a user is present, the range corresponding to a field of view of the user;
    obtaining a composite image by combining the remote location person image with the field-of-view image, the remote location person image being combined at a position of an imaging device capturing an image of the user and in a size based on a positional relationship between the user and the imaging device; and
    controlling a display to display the composite image.

12. The control method according to claim 11, further comprising acquiring, by an image sensor, the field-of-view image by capturing the range in the real space.

13. The control method according to claim 11, further comprising detecting the imaging device from the real space.

14. The control method according to claim 13, wherein, in the detecting, the imaging device is detected by detecting a marker placed in advance in the real space.

15. The control method according to claim 13, wherein, in the detecting, the imaging device is detected in accordance with an instruction from the user.

16. A non-transitory computer readable medium that stores a program, wherein the program causes a computer to execute a control method of controlling an information processing apparatus, the control method comprising:
    acquiring a remote location person image that is an image acquired by capturing an image of a person at the remote location;
    acquiring a field-of-view image that represents a range in a real space where a user is present, the range corresponding to a field of view of the user;
    obtaining a composite image by combining the remote location person image with the field-of-view image, the remote location person image being combined at a position of an imaging device capturing an image of the user and in a size based on a positional relationship between the user and the imaging device; and
    controlling a display to display the composite image.

17. The control method according to claim 16, further comprising acquiring, by an image sensor, the field-of-view image by capturing the range in the real space.

18. The control method according to claim 16, further comprising detecting the imaging device from the real space.

19. The control method according to claim 18, wherein, in the detecting, the imaging device is detected by detecting a marker placed in advance in the real space.

20. The control method according to claim 18, wherein, in the detecting, the imaging device is detected in accordance with an instruction from the user.

* * * * *